(12) United States Patent
Tynan, Jr. et al.

(10) Patent No.: US 11,401,445 B2
(45) Date of Patent: *Aug. 2, 2022

(54) FILAMENT REINFORCED TAPES USEFUL AS UNDERWATER PIPE WRAP

(71) Applicant: Intertape Polymer Corp., Sarasota, FL (US)

(72) Inventors: John K. Tynan, Jr., Marysville, MI (US); Deborah A. Chrzanowski, Corunna (CA); Mark A. Lewandowski, Fort Gratiot, MI (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,740

(22) Filed: Sep. 24, 2020

(65) Prior Publication Data

US 2021/0009862 A1 Jan. 14, 2021

Related U.S. Application Data

(60) Continuation of application No. 16/665,929, filed on Oct. 28, 2019, which is a continuation of application (Continued)

(51) Int. Cl.
*C09J 7/29* (2018.01)
*B32B 7/12* (2006.01)
(Continued)

(52) U.S. Cl.
CPC ............ *C09J 7/29* (2018.01); *B32B 1/08* (2013.01); *B32B 5/022* (2013.01); *B32B 5/024* (2013.01); *B32B 5/026* (2013.01); *B32B 5/10* (2013.01); *B32B 5/18* (2013.01); *B32B 5/245* (2013.01); *B32B 5/26* (2013.01); *B32B 7/12* (2013.01); *B32B 23/10* (2013.01); *B32B 25/10* (2013.01); *B32B 25/16* (2013.01); *B32B 27/12* (2013.01); *B32B 27/30* (2013.01); *B32B 27/302* (2013.01); *B32B 27/304* (2013.01); *B32B 27/306* (2013.01); *B32B 27/32* (2013.01); *B32B 27/34* (2013.01); *B32B 29/02* (2013.01); *B65D 65/22* (2013.01); *B32B 5/00* (2013.01); *B32B 5/02* (2013.01); *B32B 5/12* (2013.01); *B32B 7/04* (2013.01); *B32B 27/36* (2013.01); *B32B 2255/02* (2013.01); *B32B 2255/26* (2013.01); *B32B 2260/021* (2013.01); *B32B 2260/046* (2013.01); *B32B 2262/02* (2013.01); *B32B 2262/0253* (2013.01); *B32B 2262/0269* (2013.01); *B32B 2262/0276* (2013.01); *B32B 2262/062* (2013.01); *B32B 2262/101* (2013.01); *B32B 2262/106* (2013.01); *B32B 2262/14* (2013.01); *B32B 2270/00* (2013.01); *B32B 2305/10* (2013.01); *B32B 2305/55* (2013.01); *B32B 2307/50* (2013.01); *B32B 2307/516* (2013.01); *B32B 2307/518* (2013.01); *B32B 2307/54* (2013.01); *B32B 2307/546* (2013.01); *B32B 2307/714* (2013.01); *B32B 2367/00* (2013.01); *B32B 2405/00* (2013.01); *B32B 2553/00* (2013.01); *B32B 2597/00* (2013.01); *C09J 7/20* (2018.01); *C09J 7/22* (2018.01); *C09J 7/25* (2018.01); *C09J 7/255* (2018.01); *C09J 7/38* (2018.01); *C09J 2203/302* (2013.01); *C09J 2400/263* (2013.01); *D04H 1/74* (2013.01); *D04H 3/00* (2013.01); *D04H 3/005* (2013.01); *D04H 3/011* (2013.01); *D04H 3/02* (2013.01); *D04H 3/12* (2013.01); *D07B 7/14* (2013.01); *F16L 9/12* (2013.01); *F16L 9/16* (2013.01); *F16L 11/00* (2013.01); *F16L 11/24* (2013.01); *F16L 57/00* (2013.01); *F16L 57/04* (2013.01); *F16L 57/06* (2013.01); *F16L 58/16* (2013.01); *G02B 6/44* (2013.01); *G02B 6/4457* (2013.01); *G02B 6/4489* (2013.01); *H01B 13/06* (2013.01); *H02G 9/00* (2013.01); *H02G 9/02* (2013.01);

(Continued)

(58) Field of Classification Search
None
See application file for complete search history.

(56) References Cited

U.S. PATENT DOCUMENTS 3,526,086 A 9/1970 Morgan
3,608,180 A 9/1971 Sharp, Jr.

(Continued)

FOREIGN PATENT DOCUMENTS

EP 324242 A2 7/1989
EP 1457313 A1 9/2004

(Continued)

OTHER PUBLICATIONS

Wallenberger, Frederick T. et al. "Glass Fiber" ASM Handbook, vol. 21: Composites (#06781G) (pp. 27-34) (2001) (Year: 2001).*

(Continued)

*Primary Examiner* — Vivian Chen
(74) *Attorney, Agent, or Firm* — Moore & Van Allen PLLC

(57) ABSTRACT

A member for use in undersea applications comprising a plurality of conduits assembled into a bundle; the bundle being wrapped with a pressure-sensitive tape comprising a backing, a layer of corrosion-resistant yarns on one surface of the backing, and pressure-sensitive adhesive layer that coats the corrosion-resistant yarns and binds them to the backing.

20 Claims, No Drawings

Related U.S. Application Data

No. 14/098,887, filed on Dec. 6, 2013, now Pat. No. 10,457,455, which is a division of application No. 11/859,156, filed on Sep. 21, 2007, now abandoned.

(60) Provisional application No. 60/847,637, filed on Sep. 27, 2006, provisional application No. 60/847,223, filed on Sep. 26, 2006.

(51) Int. Cl.

| | | |
|---|---|---|
| *B32B 5/02* | (2006.01) | |
| *B32B 5/18* | (2006.01) | |
| *B32B 5/24* | (2006.01) | |
| *B32B 5/26* | (2006.01) | |
| *B32B 23/10* | (2006.01) | |
| *B32B 25/10* | (2006.01) | |
| *B32B 25/16* | (2006.01) | |
| *B32B 27/30* | (2006.01) | |
| *B32B 27/32* | (2006.01) | |
| *B32B 27/34* | (2006.01) | |
| *B32B 29/02* | (2006.01) | |
| *B32B 5/10* | (2006.01) | |
| *B32B 27/12* | (2006.01) | |
| *B32B 1/08* | (2006.01) | |
| *B65D 65/22* | (2006.01) | |
| *F16L 9/16* | (2006.01) | |
| *F16L 9/12* | (2006.01) | |
| *F16L 57/04* | (2006.01) | |
| *F16L 57/06* | (2006.01) | |
| *F16L 57/00* | (2006.01) | |
| *F16L 58/16* | (2006.01) | |
| *F16L 11/24* | (2006.01) | |
| *F16L 11/00* | (2006.01) | |
| *D07B 7/14* | (2006.01) | |
| *H02G 9/02* | (2006.01) | |
| *G02B 6/44* | (2006.01) | |
| *H02G 9/00* | (2006.01) | |
| *H01B 13/06* | (2006.01) | |
| *D04H 3/005* | (2012.01) | |
| *D04H 3/011* | (2012.01) | |
| *D04H 1/74* | (2006.01) | |
| *D04H 3/00* | (2012.01) | |
| *D04H 3/02* | (2006.01) | |
| *D04H 3/12* | (2006.01) | |
| *B32B 5/12* | (2006.01) | |
| *B32B 27/36* | (2006.01) | |
| *B32B 5/00* | (2006.01) | |
| *B32B 7/04* | (2019.01) | |
| *C09J 7/25* | (2018.01) | |
| *C09J 7/20* | (2018.01) | |
| *C09J 7/38* | (2018.01) | |
| *C09J 7/22* | (2018.01) | |

(52) U.S. Cl.
CPC .. *Y10T 428/1393* (2015.01); *Y10T 428/24994* (2015.04); *Y10T 428/249933* (2015.04); *Y10T 428/249934* (2015.04); *Y10T 428/249942* (2015.04); *Y10T 428/28* (2015.01); *Y10T 428/2848* (2015.01); *Y10T 428/31786* (2015.04)

(56) References Cited

U.S. PATENT DOCUMENTS

| | | | |
|---|---|---|---|
| 3,716,437 A | 2/1973 | Satas et al. | |
| 3,900,584 A * | 8/1975 | Rosinski | G01N 33/38 427/8 |
| 3,990,584 A | 11/1976 | Strawson et al. | |
| 4,067,855 A | 1/1978 | Miwa et al. | |
| 4,246,145 A * | 1/1981 | Molinier | C03C 25/26 524/22 |
| 4,260,659 A * | 4/1981 | Gobran | C09J 7/38 428/217 |
| 4,295,871 A * | 10/1981 | Droux | C08J 5/24 65/448 |
| 4,376,179 A * | 3/1983 | Agarwal | C09J 121/00 524/65 |
| 4,431,598 A * | 2/1984 | Korpman | B29C 48/92 264/40.7 |
| 4,454,192 A | 6/1984 | Suzuki | |
| 4,479,999 A | 10/1984 | Buckley et al. | |
| 4,539,248 A | 9/1985 | Brockington et al. | |
| 4,645,697 A | 2/1987 | Torigoe | |
| 4,769,276 A | 9/1988 | Gruss et al. | |
| 4,770,490 A | 9/1988 | Gruenewald et al. | |
| 4,818,610 A | 4/1989 | Zimmerman et al. | |
| 4,850,395 A | 7/1989 | Briggs | |
| 4,894,259 A | 1/1990 | Kuller | |
| 5,236,761 A * | 8/1993 | Cammack, II | B29C 70/086 428/109 |
| 5,277,957 A * | 1/1994 | Lopez | B29C 70/086 428/105 |
| 5,348,801 A * | 9/1994 | Venzi | B32B 27/12 428/354 |
| 5,392,374 A * | 2/1995 | Gorian | G02B 6/4436 174/68.1 |
| 5,607,529 A | 3/1997 | Adamczyk et al. | |
| 5,843,261 A * | 12/1998 | Abraham, Jr. | B29C 63/105 156/184 |
| 5,928,783 A * | 7/1999 | Phan | C09J 157/12 428/355 EN |
| 5,942,299 A | 8/1999 | Tynan et al. | |
| 6,165,586 A | 12/2000 | Nouveau et al. | |
| 6,372,341 B1 | 4/2002 | Jung et al. | |
| 6,641,330 B1 | 11/2003 | Andersen et al. | |
| 6,773,806 B1 * | 8/2004 | Nakagawa | C08L 23/04 428/343 |
| 6,789,380 B2 | 9/2004 | Mellott et al. | |
| 6,820,382 B1 | 11/2004 | Chambers et al. | |
| 6,979,479 B2 | 12/2005 | Lavan et al. | |
| 6,994,904 B2 | 2/2006 | Joseph et al. | |
| 7,026,033 B2 | 4/2006 | Fujimori et al. | |
| 7,056,844 B2 * | 6/2006 | Sheely | C09J 7/29 442/58 |
| 7,377,555 B2 * | 5/2008 | Smith, III | G02B 6/4428 285/317 |
| 7,987,875 B2 | 8/2011 | Rytter | |
| 10,457,455 B2 | 10/2019 | Tynan, Jr. et al. | |
| 2001/0010367 A1 * | 8/2001 | Burnell-Jones | F21V 7/30 252/301.36 |
| 2002/0164446 A1 | 11/2002 | Zhou et al. | |
| 2003/0026967 A1 | 2/2003 | Joseph et al. | |
| 2003/0074878 A1 * | 4/2003 | Mellott | B29C 66/1122 57/10 |
| 2003/0114056 A1 * | 6/2003 | Sheely | C09J 7/29 442/38 |
| 2004/0180185 A1 | 9/2004 | Fujimori et al. | |
| 2004/0204529 A1 * | 10/2004 | Gipson | C09J 153/02 524/474 |
| 2005/0112968 A1 * | 5/2005 | Panse | B32B 27/40 442/59 |
| 2006/0151656 A1 * | 7/2006 | Gallagher | F16L 55/1652 242/437 |
| 2007/0059521 A1 | 3/2007 | Nakamura | |
| 2007/0184735 A1 * | 8/2007 | Yun | C09J 7/22 442/149 |
| 2007/0184736 A1 | 8/2007 | Seitz et al. | |
| 2008/0026214 A1 * | 1/2008 | Green | B32B 27/12 428/349 |
| 2008/0085388 A1 * | 4/2008 | Tynan, Jr. | B32B 25/16 428/36.91 |
| 2009/0047483 A1 | 2/2009 | Sugahara et al. | |
| 2010/0055435 A1 | 3/2010 | Neubert et al. | |

(56) References Cited

U.S. PATENT DOCUMENTS

| | | | | |
|---|---|---|---|---|
| 2011/0086563 | A1* | 4/2011 | Lange | C09J 153/02 |
| | | | | 442/1 |
| 2014/0144801 | A1* | 5/2014 | Tynan, Jr. | B32B 27/34 |
| | | | | 206/443 |
| 2020/0055649 | A1* | 2/2020 | Tynan, Jr. | B32B 5/18 |
| 2021/0009862 | A1 | 1/2021 | Tynan, Jr. et al. | |

FOREIGN PATENT DOCUMENTS

| | | |
|---|---|---|
| GB | 848524 A | 9/1960 |
| JP | 09137133 A | 5/1997 |
| WO | 9826921 A1 | 6/1998 |
| WO | 2001029470 A1 | 4/2001 |
| WO | 2009025671 A3 | 5/2009 |

OTHER PUBLICATIONS

"Vectran—Liquid Crystal Technology" (1999). (Year: 1999).*
"Vectran Engineering Data" (1999) (Year: 1999).
Product information and product data sheet for Scotch® High Strength Filament Tape 890 by 3M (Feb. 1999).
Product information and technical data sheet for Scotch® Filament Tape 8981 by 3M (May 2003).
"Twist," published online on Dec. 15, 2005 and recorded by The Internet Archive, Kuraray, Inc., http://web.archive.org/web/20051215183907/http://vectranfiber.com/twist.asp.
"Vectra Polymer," published online on Dec. 15, 2005 and recorded by The Internet Archive, Kuraray, Inc., http:///web.archive.org/web/20051215182339/http://vectranfiber.com/vectra_polymer.asp#.
"Vectran Fiber Product Line," published online on Dec. 15, 2005 and recorded by The Internet Archive, Kuraray, Inc., http://web.archive.org/web/20051215173019/http://vectranfiber.com/general_properties.asp.
Printout of Vectran website, from The Internet Archive, published Aug. 2005, Kuraray America, http://www.archive.org/web/*/www.vectranfiber.com (accessed Sep. 1, 2009).
"Vectran Liquid Crystal Technology" (2006) (Year 2006).
PCT, International Preliminary Report on Patentability and Written Opinion, International Application No. PCT/US2007/079262 (dated Apr. 15, 2009).
Vectran fiber introduction, accessed Sep. 2, 2009, published by Kuraray America, http://www.vectranfiber.com/enginering_introduction.asp (accessed Sep. 2, 2009).
CA, Office Action, Canadian Application No. 2,663,458 (dated Nov. 16, 2012).
CA, Office Action, Canadian Application No. 2,663,458 (dated Oct. 17, 2013).
EP, Communication pursuant to Article 94(3) EPC, European Patent Application No. 07875185.6, 3 pages (dated Feb. 27, 2013).
BR, Office Action with English Translation; Brazilian Patent Application No. PI0716822-5, 5 pages (dated Sep. 8, 2016).
CA, Office Action, Canadian Patent Application No. 2,896,233, 3 pages (dated Jul. 4, 2016).
ID, Office Action, Indonesian Patent Application No. W-00200900748, 2 pages (dated Jul. 9, 2016).
"Directly," obtained Sep. 19, 2017, Merriam-Webster, Inc., https://www.merriam-webster.com/dictionary/directly (Year: 2017).
Brazil, Technical Examination Report in Brazil Application Serial No. PI0716822-5 dated Dec. 27, 2017.
Brazilian Office Action dated Mar. 17, 2017, received in Brazilian Patent application No. PI0716822-5, translation also attached, pp. 1-18.

* cited by examiner

FILAMENT REINFORCED TAPES USEFUL AS UNDERWATER PIPE WRAP

CROSS REFERENCE TO RELATED APPLICATIONS

This application is a continuation of U.S. application Ser. No. 16/665,929, filed Oct. 28, 2019, which is a continuation of U.S. application Ser. No. 14/098,887, filed Dec. 6, 2013, now U.S. Pat. No. 10,457,455, which is a divisional of U.S. application Ser. No. 11/859,156, filed Sep. 21, 2007, abandoned, which claims the benefit of U.S. Provisional Application No. 60/847,223 filed Sep. 26, 2006, and U.S. Provisional Application No. 60/847,637 filed Sep. 27, 2006, the entire contents of which each are hereby incorporated by reference.

BACKGROUND

This disclosure relates to reinforcing materials that are useful in the manufacture of pipes, rods, conduits and conduit bundles for undersea deployment, and the wrapping of pipes, rods, conduits and conduit bundles with these materials.

Filament reinforced tapes have been used in the construction of undersea conduit or in the assembly of conduit bundles. For purposes of this disclosure, the term "conduit" may be understood to broadly refer to any tube for transporting one or more utilities such as natural gas, oil, water, electrical cable, optical filament, phone cable, and the like. The term "tubular member" is used herein to more broadly refer to tubular members such as pipes and rods, as well as conduits. In a more particular example, the conduit may be an unbonded, flexible, continuous, spoolable tube. One tape that has been used for this purpose is a glass filament reinforced tape available commercially from 3M Company under the designation Scotch 890 Filament tape. This tape is advertised as having an initial tensile strength of 600 lb/in width, but when tested in sea water at up to 70° C. its strength degrades rapidly and it is not desirable for long term, e.g., 25 year service life, undersea applications.

U.S. Pat. No. 6,641,330 illustrates one application of filament-reinforced tapes to undersea conduit wherein a plurality of undersea conduits are bound together using filament-reinforced tapes as the conduits are payed out and laid at sea. Scotch glass filament-reinforced tape 8981 is disclosed as being suitable for this purpose. In another application, filament-reinforced tapes have been used in the construction of undersea conduit to provide a filament-reinforced inner layer that is used to bind metal wire or band reinforcements that are wound around an intermediate polymeric tube that is fabricated during the manufacturing process. However, for each of these applications, it is desired that the filament-reinforced tape retain its properties for up to 25 years when the tape is deployed under seawater. In particular, this means that the tape should be resistant to high external pressures at depths up to 3,000 meters and resist the corrosive effects of seawater.

Accordingly, there is a need for a flexible filament-reinforced material or pressure sensitive adhesive tape for building and/or wrapping or binding undersea conduit.

SUMMARY

One embodiment of the invention is a tape that includes a backing, a layer of corrosion-resistant filaments on one surface of the backing, and a pressure sensitive adhesive layer coating the filaments and binding them to the backing. In accordance with the invention, the reinforcing filaments are selected from E-CR, S, E and AR glass filaments, coated glass filaments, ultra high molecular weight (UHMW) polyethylene filaments, UHMW polypropylene filaments, aramid filaments, liquid crystalline polymer (LCP) filament, carbon filament, and combinations thereof. LCP filament is a wholly aromatic liquid crystal polyester filament. One example is 6-naphthalene carboxylic acid, 6-(acetyloxy)-polymer with 4-(acetyloxy) benzoic acid (CAS #70679-92-4), which is commercially available as VECTRAN™.

In another embodiment of the invention, a method is provided, which comprises: providing at least one tubular member, winding a wire reinforcement about the tubular member, and winding a filament-reinforced material or pressure sensitive adhesive tape as disclosed herein over the wire reinforcement, and coating the filament reinforced tubular member with a layer of extruded polymer. In a more particular embodiment, the tubular member(s) is/are conduit(s).

In a further embodiment, the reinforced pressure-sensitive tapes described herein may be used to splice two conduits together.

In accordance with another embodiment of the invention, a method of binding a plurality of tubular members is provided comprising the steps of: providing a plurality of tubular members, and wrapping the plurality of tubular members with a filament reinforced material or tape, the filament reinforcement being selected from the group consisting of E-CR, S, E and AR glass filaments, coated glass filaments, UHMW polyethylene filaments, UHMW polypropylene filaments, aramid filaments, liquid crystalline polymer (LCP) filament, carbon filament, and combinations thereof. In a more particular embodiment, the tubular member(s) is/are conduit(s). In accordance with another embodiment of the invention, this method is carried out on a sea-going vessel and the method additionally includes the step of laying the wrapped conduits in the sea by advancing the conduits from the vessel.

In accordance with one particular embodiment, the filament is a wholly aromatic LCP filament, and, more particularly VECTRAN™.

DETAILED DESCRIPTION

One embodiment of the invention is a filament-reinforced tape for use in the manufacture, wrapping and/or bundling of tubular member(s) and, more particularly, conduit(s) for deployment undersea, which comprises: a carrier, a layer of filament reinforcement such as E-CR, S, E and AR glass filaments, coated glass filaments, UHMW polyethylene filaments such as those commercially available as Spectra and Dyneema filaments and fibers, UHMW polypropylene filaments, aramid filaments such as those commercially available as Kevlar, liquid crystalline polymer (LCP) filament, carbon filament, and combinations thereof, and a pressure-sensitive adhesive layer that binds the filament reinforcements to the carrier. A release coating or liner is used to produce a self-wound product in the case of a pressure sensitive tape.

The carrier utilized in the tapes may be any suitable polymeric film, paper, woven or non-woven material of the type encountered in tape products. Representative polymeric film examples may include, but are not limited to: polyethylene, polypropylene, polyamides, cellulose acetate, copolymers of vinyl chloride and vinyl acetate, polyvinyl chloride, polyvinylidene chloride, polyvinyl butyral, polystyrene, polytrifluorochloroethylene, synthetic rubbers such as butadiene-styrene and ABS polymers, mono or biaxially oriented polypropylene films, polyester, PVC, blends of any of the above polymers, release and other films, as well as foamed materials, wovens, knits, and nonwovens in web form. In a particular embodiment, polyethyleneteraphthalate (PET) is used. Any grade conventionally employed in the production of pressure-sensitive tapes is acceptable.

Pressure sensitive adhesives (PSA) useful in certain embodiments of the invention include polymeric-based adhesives. PSA's include, but are not limited to, PSA's derived from acrylic, silicone, synthetic rubber, natural rubber and modified acrylic formulations. Several common techniques are used for manufacturing PSA's including solvent-based, hot-melt and emulsion processes. In solvent-based fabrication, the adhesive ingredients are polymerized, dissolved or dispersed in solvent and cast onto a web. After the adhesive is deposited on the carrier or transfer substrate, the solvent is dried, leaving behind the functional adhesive. Hot-melt processing typically involves thermoplastic rubbers formulated with tackifying resins, oils and antioxidants. The hot melt adhesive is deposited on the carrier or transfer substrate at very high temperatures (greater than about 300° F.) and solidifies prior to being wound in the roll. Emulsion techniques use adhesive ingredients that are polymerized in water deposited on the carrier or transfer substrate and then dried. In one embodiment the coated adhesive composition may be crosslinked with the aid of electron beams or UV energy in a manner known in the art. For example, cross-linking the adhesive using UV energy requires the addition of appropriate UV promoters (e.g., photoinitiators, such as peroxides).

Any known coating technique can be used to apply the adhesive. Slot-die coating, roll-over-roll, knife-over-roll, curtain and calendering processes are examples of techniques that can be used.

In another embodiment, the reinforcement is used in the form of a band, scrim, strap, or cloth. The reinforcement may deploy the reinforcing fibers disclosed herein bidirectionally or unidirectionally. Combinations of reinforcing fibers may be used in any reinforcement or combinations of reinforcing fibers and fibers that are not necessarily reinforcing but function to bind the reinforcement together. For example, a scrim may be prepared having VECTRAN™ filament running in the warp direction and cotton or nylon filament may run in the weft direction. These reinforcements may be incorporated into a pressure-sensitive tape. Alternatively, the reinforcement may be wrapped or wound directly around the tubular member(s) or conduit without incorporating into a tape and the tubular member(s) or conduit(s) may be coated with one or more extruded polymer covering layers. In another embodiment, the reinforcement filament may be formed into a fiber and wrapped or wound around the tubular member(s) or conduit(s) directly.

One filament that is particularly desirable for use in one embodiment of the invention is a filament that is essentially free of atomic elements or molecular species that may weaken or may be leached out in the presence of seawater thereby weakening the reinforcing character of the filament over time. One example of such is ultra-high molecular weight olefin filaments. These filaments are characterized in that it is essentially free of boron and fluorides and it is resistant to the leaching of metallic ions such as calcium and magnesium ions by seawater. UHMW olefin filaments useful in the invention are commercially available from Honeywell and DSM.

Carbon filaments are useful in another embodiment of the invention. Carbon is substantially resistant to alkali. Carbon filaments are available from Toray.

In another embodiment of the invention, LCP filaments are used. VECTRAN™ is a high performance multi-filament yam spun from liquid crystal polymer (LCP), a wholly aromatic polyester, and exhibits exceptional strength and rigidity. VECTRAN™ filament is supplied by Kuraray America, Inc. VECTRAN™ is a co-polymer of p-hydroxybenzoic acid and a 6 hydroxy-2-naphthoic acid. VECTRAN™ is available in 200 to 1500 denier. It is available as an untwisted filament or a filament twisted up to 2.5 times per inch. Any of these commercially available filaments can be used in accordance with this disclosure.

Coated filaments are long, thin, flexible filaments made of glass (e.g., E-glass), carbon, plastic or the like, wherein the filament is coated, covered, or impregnated with protective materials, such as but not limited to lacquer, varnish, rubber, or polymers. In one embodiment of this invention, typical coatings suitable for producing a coated filament may contain compositions such as epoxy-polyamide (epoxies), isocyanate-amine (polyureas), isocyanate-polyol (polyurethanes), acrylate copolymer (cyanoacrylates) and polyol-acid (polyesters). These coatings may be used in conjunction with any of the filaments discussed above to improve corrosion resistance where the corrosion resistance of the filament itself is not suitable. The coatings must be flexible and uniformly applied over the filaments so that, in the winding of the tape, they do not become discontinuous and therefore ineffective. If the coating continuity is compromised, the filaments will be exposed to corrosive agents. In one embodiment, glass is coated with a polymeric coating. In another embodiment E-glass is coated with a polymeric coating. Our particular coating is sold under the name Genflo3000, a carboxylated styrene butadiene latex available from Omnova Solutions, Inc.

In accordance with a further embodiment of the invention, combinations of any of the aforementioned filaments may be used in the reinforcing material or tape. In particular, in accordance with one embodiment of the invention, E-glass can be warped with E-CR glass filaments. Similarly, E-glass filaments can be warped with AR glass filaments. In accordance with still another embodiment of the invention, E-glass filaments can be warped with S-2 glass, carbon glass, VECTRAN™, and/or Spectra filaments. While the E-glass filaments are not as corrosion resistant as the other filaments mentioned above, there may be cost advantages in some applications to using the E-glass filament, which is generally less expensive than the ECR filament. When using filaments in combination in accordance with this embodiment of the invention, the filaments may be used in any suitable orientation. For example, one filament may be oriented parallel the tape while another filament may be oriented perpendicular to the tape, mixtures of both filaments may be oriented parallel and perpendicular to the tape and the filaments may also be oriented at any angle between parallel and orthogonal.

The filaments will be incorporated in the tape in an amount that provides the desired strength characteristics, e.g., tensile strength. Commercially available denier or diameter filaments can be used. In one embodiment, the filaments are oriented in a direction parallel the length of the tape. However, they can be oriented in the cross direction, in the cross-wise and length-wise direction as in scrims, cloths and composites, or at any angle that is suitable to the purpose. A random orientation may also be acceptable in some applications. To increase tensile strength, the filaments may be twisted. For example, untwisted 1500 denier VECTRAN™ filament has an average 81 lb/strand tensile strength while a 1500 denier VECTRAN™ filament that is twisted 1.5 times per inch (TWI) has an average 89 lb/in tensile strength. The VECTRAN™ filaments may be used in amounts of 10 EPI or greater, more particularly 20 EPI or greater.

In accordance with a further embodiment, the invention provides a method for bundling tubular member(s) or conduit(s) for undersea applications. In accordance with this invention, tubular member(s) or conduit(s) are wrapped in one or more layers of filament-reinforced tapes and/or band, cloth, or fiber reinforcements as described herein. These tapes and reinforcing materials may be wrapped in one or more layers that may partially or substantially overlap. In a particular embodiment, two filament-reinforced tapes are wrapped around the bundled members in opposite directions such that the reinforcing filaments in the respective tapes cross and thereby strengthen the bundled product. Similar techniques can be used in manufacturing conduit using filament-reinforced tapes and reinforcing materials in accordance with the invention. That is, the filament-reinforced tape can be wrapped around the conduit intermediate. The tape may partially or substantially completely overlap or, in another embodiment, two tapes may be wrapped around the intermediate in opposite directions (or a plurality of different orientations) such that the reinforcing filaments cross. The number of layers will depend upon the amount of filament incorporated into the tape and the strength/tensile characteristics desired in the final product.

The reinforced conduit is typically covered with one or more polymer coatings. These coatings are typically extruded over the reinforced conduit. Examples of the extruded coverings are known in the art and include polymers such as HDPE, PVDF, etc.

Example

In accordance with one non-limiting example, a tape is prepared using a 92 gauge polyester backing, 1500 denier twisted VECTRAN™ filaments oriented parallel the length of the tape. The filaments are adhered to the backing by application of a crosslinked natural rubber adhesive. In more detail, the filaments are assembled with the PET backing and the assembly is coated with a laminating layer of adhesive. In this example, the laminating adhesive is a NR base, 40% solids, applied at a coverage of 16 lbs/ream. The laminating adhesive is dried and the tape is coated with a topcoat adhesive. In this example, the topcoat was applied in two coats. Each coat was the same 40% solids NR adhesive used in the laminating process but applied in an amount of 21 lbs/ream for a total topcoat adhesive coating of 42 lbs/ream. The release coat was then applied to the opposite side of the PET backing as a 1% solids coating in a dry weight of 0.02 lbs/ream. The release layer used in this example is a Quilon (QBX) release agent. In accordance with one embodiment a tape as described in this example was made using 14 EPI (ends per inch) VECTRAN™ filaments. In another embodiment a tape as described herein was made using 21 EPI VECTRAN™ filaments. The 14 EPI tape had an initial tensile strength of 1000 lb/in. The 21 EPI tape had an initial tensile strength of 1800 lb/in. Both tapes were tested in 70° C. seawater under a static load to construct a log time-log load regression curve for extrapolating the 25 year tape strength. The testing showed that the 14 EPI tape retained 414 lbs/in load strength over 25 years and the 21 EPI tape retained 625 lb/in load strength.

Having described the invention in detail and by reference to specific embodiments thereof, it will be apparent that numerous modifications are possible without departing from the spirit and scope of the following claims.

What is claimed is:

1. A tape comprising a polymeric film backing; a layer of corrosion-resistant fiber directly adjacent one surface of the polymeric film backing; a first pressure sensitive adhesive layer bonding the corrosion-resistant fiber directly to the backing; and a second pressure sensitive adhesive layer directly adjacent the first pressure sensitive adhesive layer bonding the corrosion-resistant fiber directly to the polymeric film backing; wherein the first pressure sensitive adhesive layer and the second pressure sensitive adhesive layer comprise the same adhesive.

2. The tape of claim 1, wherein the corrosion-resistant fiber is EC-R glass, AR glass, or carbon filament.

3. The tape of claim 2, wherein the corrosion-resistant fiber is polymer coated.

4. The tape of claim 1, wherein the corrosion-resistant fiber comprises S glass, E glass, polymer coated S glass, polymer coated E glass, aramid, ultra-high molecular weight (UHMW) olefin.

5. The tape of claim 1, additionally including a release layer on the surface of the polymeric film backing opposite the corrosion-resistant fiber.

6. The tape of claim 1, wherein the tape provides an initial tensile strengths of at least 1000 lb/in.

7. The tape of claim 1, wherein the tape provides an initial tensile strength of at least 1500 lb/in.

8. The tape of claim 1, wherein the tape provides an initial tensile strength of at least 1800 lb/in.

9. The tape of claim 1, wherein the fiber is twisted.

10. The tape of claim 1, wherein the fiber has a denier of about 200 to 1500.

11. The tape of claim 1, wherein the fiber is arranged on the polymeric film backing in an amount of at least 10 ends per inch (EPI).

12. The tape of claim 1, wherein the fiber is arranged on the polymeric film backing in an amount of at least 20 ends per inch (EPI).

13. An undersea member comprising:
at least one tubular member wrapped in a fiber reinforced tape, the fiber reinforced tape comprising
a polymeric film backing; and
a layer of corrosion-resistant fiber, the fiber comprises glass, plastic, carbon filament, or combinations thereof directly adjacent one surface of the polymeric film backing; a first pressure sensitive adhesive layer bonding the corrosion-resistant fiber directly to the polymeric film backing; and a second pressure sensitive adhesive layer directly adjacent the first pressure sensitive adhesive layer bonding the corrosion-resistant fiber directly to the polymeric film backing; wherein the first pressure sensitive adhesive layer and the second pressure sensitive adhesive layer comprise the same adhesive.

14. The member of claim 13, wherein a plurality of conduits are wrapped in the fiber reinforced tape.

15. The member of claim 13, wherein the fibers comprise EC-R glass, AR glass, polymer coated EC-R glass, polymer coated AR glass, or carbon filament.

16. The member of claim 13, wherein the fibers comprise S glass, E glass, polymer coated S glass, polymer coated E glass, aramid, ultra-high molecular weight (UHMW) olefin.

17. A tape comprising:
a polymeric film backing;
a layer of corrosion-resistant fiber directly adjacent the polymeric film backing;
a laminating pressure sensitive adhesive layer directly adjacent the layer of corrosion-resistant fiber; and
a topcoat pressure sensitive adhesive layer directly adjacent the laminating pressure sensitive adhesive layer; wherein the laminating pressure sensitive adhesive layer and the topcoat pressure sensitive adhesive layer comprise the same adhesive.

18. The tape of claim 17, wherein the layer of corrosion-resistant fiber comprises aramid or ultra-high molecular weight (UHMW) olefin.

19. The tape of claim 17, wherein ultra-high molecular weight (UHMW) olefin is polyethylene or polypropylene.

20. The tape of claim 17, wherein the laminating pressure sensitive adhesive layer and the topcoat pressure sensitive adhesive layer comprise adhesive selected from acrylic, silicone, synthetic rubber, natural rubber and modified acrylic formulations.

\* \* \* \* \*